(12) United States Patent
Udhayan et al.

(10) Patent No.: US 12,177,463 B2
(45) Date of Patent: Dec. 24, 2024

(54) WIRELESS DISPLAY SHARING WITH DYNAMIC RESOLUTION SWITCHING

(71) Applicant: Intel Corporation, Santa Clara, CA (US)

(72) Inventors: Venkateshan Udhayan, Portland, OR (US); Kristoffer Fleming, Chandler, AZ (US); Chia-Hung S. Kuo, Folsom, CA (US); Sangeeta Manepalli, Chandler, AZ (US); Vishal Sinha, Portland, OR (US); Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 18/193,806

(22) Filed: Mar. 31, 2023

(65) Prior Publication Data

US 2024/0333946 A1 Oct. 3, 2024

(51) Int. Cl.
*H04N 19/30* (2014.01)
*H04N 19/14* (2014.01)
*H04N 19/164* (2014.01)
*H04N 19/172* (2014.01)

(52) U.S. Cl.
CPC ............ *H04N 19/30* (2014.11); *H04N 19/14* (2014.11); *H04N 19/164* (2014.11); *H04N 19/172* (2014.11)

(58) Field of Classification Search
CPC ...... H04N 19/30; H04N 19/14; H04N 19/164; H04N 19/172
See application file for complete search history.

(56) References Cited

U.S. PATENT DOCUMENTS

| | | |
|---|---|---|
| 2016/0014418 A1 | 1/2016 | Shao et al. |
| 2018/0075822 A1 | 3/2018 | Ng et al. |
| 2020/0014963 A1 | 1/2020 | Gogoi |
| 2020/0374532 A1 | 11/2020 | Tanner et al. |
| 2021/0358200 A1 | 11/2021 | Wang et al. |

OTHER PUBLICATIONS

Apr. 25, 2024 (PCT) International Search Report and Written Opinion—App. PCT/US2023/084722.

*Primary Examiner* — Jae N Noh
(74) *Attorney, Agent, or Firm* — Banner & Witcoff Ltd.

(57) ABSTRACT

A video source device for wireless display sharing, including: an encoder operable to dynamically switch between encoding a video full-frame into a first bitstream at a first resolution, and a video sub-frame into a second bitstream at a second resolution, wherein the second resolution is higher than the first resolution; processing circuitry operable to decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and a transmitter operable to wirelessly transmit the first bitstream and the second bitstream to a video sink device.

19 Claims, 5 Drawing Sheets

WIRELESS DISPLAY SHARING WITH DYNAMIC RESOLUTION SWITCHING

TECHNICAL FIELD

Aspects described herein generally relate to wireless display sharing and, more particularly, to wireless display sharing that dynamically switches between lower and higher resolution for different categories of changes.

BACKGROUND

Although wireless display systems offer convenience by eliminating the need for a wired display connection or a projector for presentations, many productivity solutions do not utilize this technology due to its sub-optimal user experience in terms of latency, power, and image fidelity. High resolution wireless display sharing at low latency demands significant processing power, which can have a major impact on power consumption. It is desirable to address this power impact without compromising visual quality, particularly for productivity applications such as word processing and presentation applications that ideally have high fidelity when sharing with large external screens or monitors. This is particularly relevant for user typing, where visual quality and higher frame rates impact a positive user experience.

DETAILED DESCRIPTION

The present disclosure describes a wireless display sharing system that aims to reduce power and latency while providing a visually lossless user experience. The system achieves this by capturing and encoding video images at a lower resolution (e.g., 1920×1080 pixels) on the video source device side and upscaling them to a higher resolution (e.g., 4K=3840×2160 pixels) at the video sink device side, which has a higher resolution screen (monitor). The system dynamically switches between lower and higher resolutions for full frame changes and sub-frame changes, respectively, to ensure a visually lossless user experience.

By way of background, some wireless display systems allow a video source device to wirelessly share graphical content with a video sink device. For example, a mobile device can wirelessly transmit graphical content to a display device (e.g., a monitor, television, or other device) for display thereon. The graphical content can be from a multitude of sources. For example, such graphical content can include screen sharing (e.g., displaying the screen of the mobile device on the display device), audiovisual files, data generated from an operating system or an application running within an operating system (e.g., word processor, an Internet browser, a virtual meeting application, a video player, a video game, and the like). The transfer of graphical content from one device to another takes time, sometimes referred to as latency. In some cases, the latency causes problems with displaying the graphical content. For example, high latency can cause display errors (e.g., half rendered displays/frames, gargled graphical data, and the like) and/or delays (e.g., a "frozen" screen, a screen that is unresponsive or slow to respond, and the like).

Figure 1:
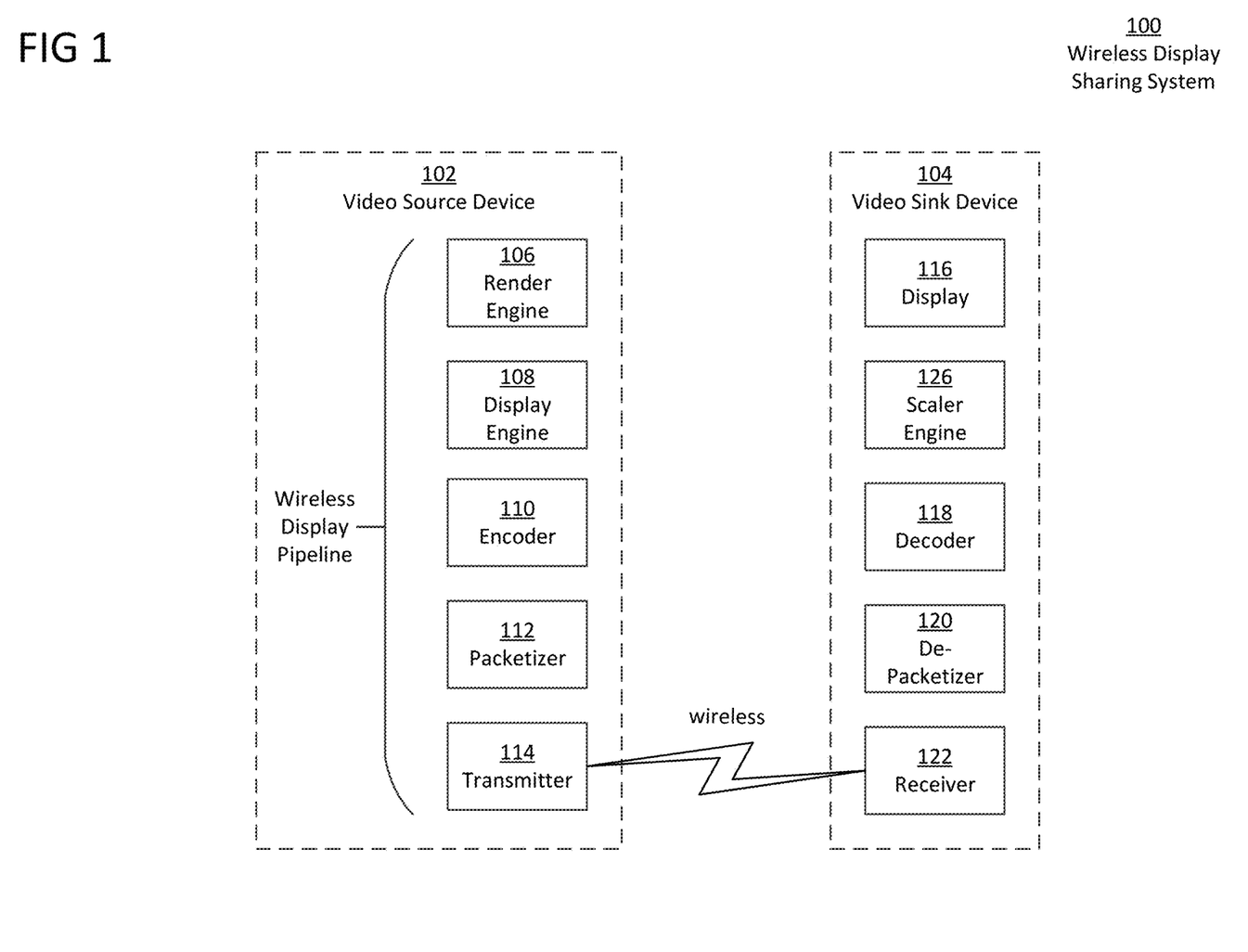
FIG. 1 illustrates a schematic diagram of a wireless display sharing system, in accordance with aspects of the disclosure.

FIG. 1 illustrates a schematic diagram of a wireless display sharing system 100, in accordance with aspects of the disclosure. The wireless display sharing system 100 comprises a video source device 102 using a wireless display pipeline to communicate video data wirelessly with a video sink device 104, in accordance with aspects of the disclosure. The video data includes an ordered set of video frames. Each video frame is made of a set of pixels. The video data may be stored locally on the video source device 102, stored remotely from the video source device 102 (cloud storage service, online file storage), and/or may streamed from an online source (e.g., a website, an application connected to a source of the video data over the Internet, an online video streaming service, an online live television streaming service).

The wireless display sharing system 100 comprises a video source device 102 configured to wirelessly transmit of a portion of a video frame and a video sink device 104 configured to receive wireless transmission of the portion of a video frame. In general, the video data may be from any source on the video source device. For example, any graphical data from the video source device 102 is treated as a video data for the purpose of transmission to the video sink device 104. In some cases, the video data is produced by an application playing a video (e.g., a video player application, an Internet browser, a virtual meeting application, and the like) or by an application generating multiple frames (e.g., a gaming application, a simulation application, and the like). The video data can be produced from any program executing on the video source device. For example, an operating system can generate a virtual desktop, views of which can be included in the video data for transferred to the video sink device for screen sharing. As another example, a view of a word processing application can be included in the video data for transferred to the video sink device. Any source of graphical data from the video source device can be utilized in the video data from transmission to and display in the video sink device 104.

The video source device 102 comprises the wireless display pipeline, which comprises a render engine 106, a display engine 108, an encoder 110, a packetizer 112, and a transmitter 114. The video sink device 104 comprises a display 116, a decoder 118, a packetizer 120, and a receiver 122. In operation, the video source device 102 processes the video data through the wireless display pipeline to facilitate transferring the video data to the video sink device 104. The video sink device 104 processes the video data, received from the video source device 102, to facilitate displaying the video data on the display 116.

The video source device 102 processes the video data through the wireless display pipeline in a particular order. In this example, the video data is processed through the wireless display pipeline in the following order: (1) the render engine 106, (2) the display engine 108, (3) the encoder 110, (4) the packetizer 112, and (5) the transmitter 114. The render engine 106 renders the video data. The display engine 108 composes the video data. In particular, the display engine 108 may blend, overlay, combine, arrange, scale or otherwise compose pixels into a final video frame for display. The encoder 110 encodes (e.g., compresses) the video data into a video compression format. The compression enables more the vide data to consume less memory for storage and/or to consume less bandwidth for transmission. The packetizer 112 generate packets corresponding to the video data. The transmitter 114 transmits the packets corresponding to the video data to the video sink device 104. Upstream components process the video data and transfer the processed data to a downstream component for further processing. For example, the render engine 106 is upstream of the display engine 108 (and the display engine 108 is downstream of the render engine 106), the display engine 108 is upstream of the encoder 110 (and the encoder 110 is downstream of the display engine 108), etc. Video data is sequentially processed by each of the components and then passed downstream to an adjacent component in the wireless display pipeline.

Although the wireless display pipeline includes several components in a particular order, each of the components is utilized when it is desired for a particular wireless display situation. There are situations in which some components of the wireless display pipeline are not utilized. In such situations, a relative order of components is preserved with the unused component(s) removed from the particular order.

The video source device 102 processes the video data in a particular order to display the video data on the display 116. In this example, the video data is processed through the video sink device 104 in the following order: 1) the receiver 122, 2) the packetizer 120, 3) the decoder 118, and 4) the display 116. The receiver 122 receives the packets corresponding to the video data (from the video source device 102). The packetizer 120 unpacks the video data from the packets. The decoder 118 decodes the video data from the video compression format. The display 116 displays the video data.

Figure 2:
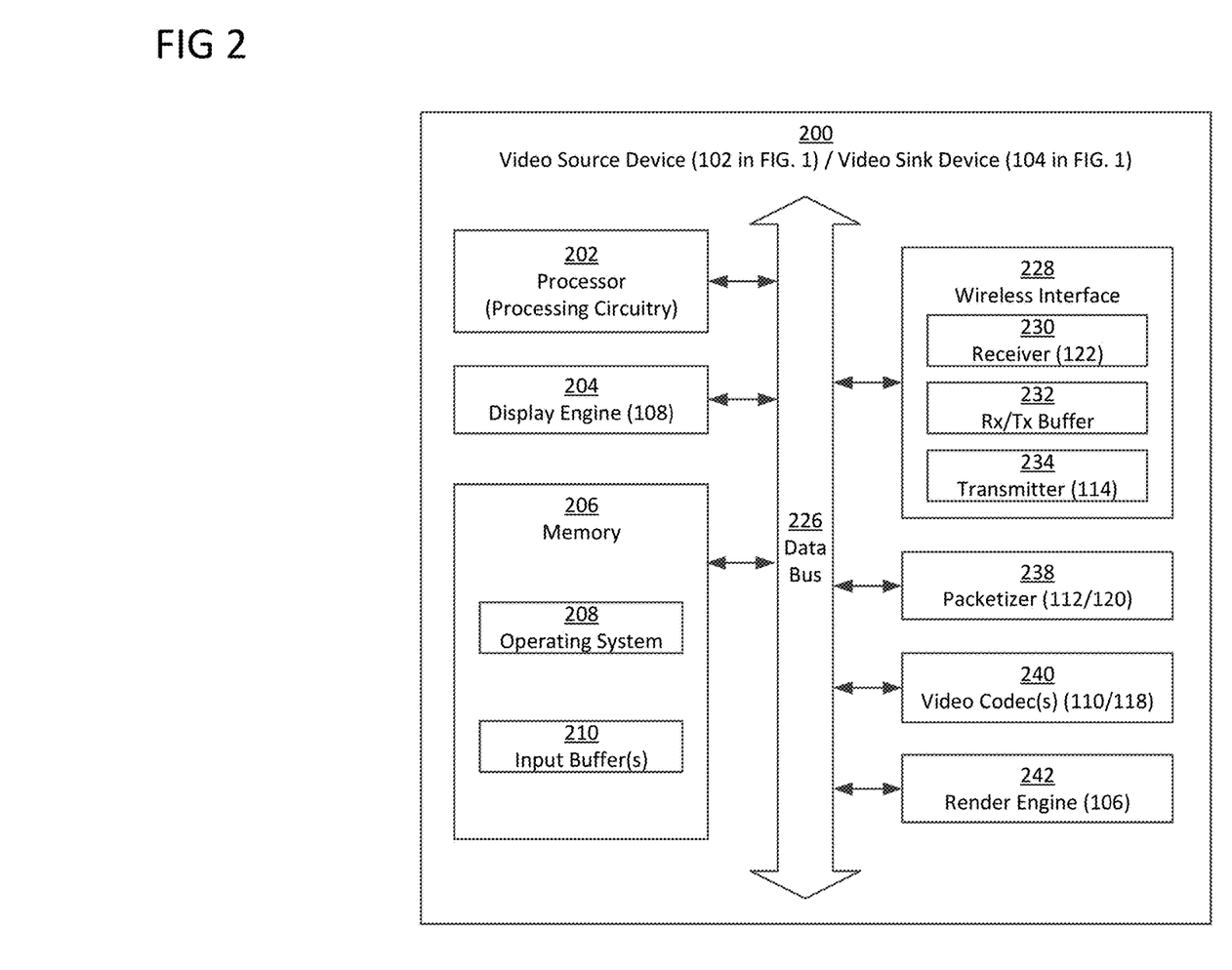
FIG. 2 illustrates a schematic diagram of a video source/sink device, in accordance with aspects of the disclosure.

FIG. 2 illustrates a schematic diagram of a video source/sink device 200 (101/104 in FIG. 1), in accordance with aspects of the disclosure.

The video source/sink device 200 comprises a processing circuitry 202, a display engine 204, a memory 206, a wireless interface 228, a packetizer 238, one or more video codecs 240, and a render engine 242, each of which is operably coupled others by a data bus 226. The memory 206 comprises an operating system 208, which includes code for execution by the processing circuitry 202. The wireless interface 228 comprises a receiver 230, a receive (Rx) and transmit (Tx) buffer 232, and a transmitter 234. The device 200 may be used to carry out the functions described herein.

The video source/sink device 200 may be any type of device operable to establish a wireless communication session with another device, such as a computer, a personal digital assistant (PDA), a laptop or electronic notebook, a cellular telephone, a tablet, a gaming console or virtual reality (VR) or artificial reality (AR) device, or any other device, component, element, network element, or object capable of initiating video, media, and/or data exchanges within a communication system.

The memory 206 is configured to store data used for the operations described herein. The memory 206 is able to store software, logic, code, or processor instructions that are executed to carry out the activities described herein and to store video data. Although depicted as a single block for clarity, the memory 206 may comprise multiple memories. For example, the memory 206 may comprise any of a hard disk drive (HDD), a solid-state drive (SSD), random access memory (RAM), a remote storage device (e.g., cloud storage service, online file storage), other memories (or combinations thereof). To achieve low latency, some data may be stored in main memory (e.g., HDD or static random access memory (SRAM)) while other data is stored in RAM (where fast access maintains low latency). The processing circuitry 202 can execute any type of instructions associated with the data to achieve the operations detailed herein.

The processing circuitry 202 may be any type of processor, such as a microprocessor, an embedded processor, a digital signal processor (DSP), a network processor, a multi-core processor, a single core processor, or other device to execute code. The processing circuitry 202 may be a single-threaded or multithreaded in that it may include more than one hardware thread context (or "logical processor"). The processing circuitry 202 is configured to execute instruction code in a manner disclosed herein. Although depicted as a single block, the processing circuitry 202 may comprise multiple (one or more) processing elements.

The wireless interface 228 comprises the receiver 230, the Rx/Tx buffer 232, and the transmitter 234. The wireless interface 228 is to wirelessly transmit and wirelessly receive data (e.g., packets). The wireless interface 228 is configured to implement any wireless communication protocol. The wireless interface 228 is configured to wirelessly transmit and wirelessly receive packets that comply with any wireless or cellular communication protocol or the like. The wireless interface 228 may be a transceiver or a transmitter-receiver. As an example, the receiver 230 may comprise a radio receiver configured to receive electromagnetic waves in a radio frequency (e.g., packets encoded in a wireless communication protocol therein); the transmitter 234 may comprise a radio transmitter configured to transmit electromagnetic waves in a radio frequency (e.g., packets encoded in a wireless communication protocol therein). The transmitter 234 and the receiver 230 can utilize the Rx/Tx buffer 232 to store data that is to be transmitted and/or to store data that is received.

The render engine 242 renders graphical data. The render engine 242 writes the rendered graphical data into an input buffer in the one or more input buffers 210. The render engine 242 can produce graphic representations of data generated by a program. Such graphic representations may include, for example, images, pixels, a video frame, or a portion of any of the foregoing. Many programs generate data that is graphically represented on a screen. Such a program may include, for example, an operating system 208, an application running within an operating system (e.g., word processor, an Internet browser, a virtual meeting application, a video player, a video game, and the like). Each program produces data that can be rendered for display on a screen. For example, text, icons, images, location of icons for the program, images corresponding to the icons, size and location of letters in the program or any other data for which a graphic representation may be displayed. The render engine 242 can process data from a three-dimensional virtual reality game to render a video frame based on inputs from an input device (e.g., render video frames that show a user's virtual perspective based on movements from a joystick). The render engine 242 writes the rendered video frame into an input buffer in the one or more input buffers 210.

The display engine 204 composites graphical data such as video data read from the one or more input buffers 210, for example, produced by the render engine 242. After composing a pixel, the display engine 204 writes the pixel into the frame buffer 212 to create a video frame. The display engine 204 may be implemented in hardware, software, firmware, or a combination thereof.

Video scaling by the display engine 204 involves converting video resolution to a higher or lower resolution. The display engine 204 of the video source device 102 down-scales video full-frames to a lower resolution for transmission, and then the display engine 204 of the video sink device 104 up-scales the received video full-frames to the original, higher resolution. The scaling process involves the use of algorithms to interpolate or extrapolate the pixels in the original video frame to fill in the additional pixels to match the higher resolution. The goal of video scaling is to preserve the image quality and minimize distortion or artifacts in the upscaled video. Various scaling techniques can be used, such as nearest neighbor, bilinear interpolation, bicubic interpolation, and Lanczos resampling. These techniques differ in their computational complexity and trade-offs between image quality and processing speed.

Each video codec of the one or more video codecs 240 can encode and decode video frames based on a video compression/coding format. Operations for encode and decode are similar. Thus, the same hardware can encode and decode. For example, a video codec is operable to encode an unencoded video frame into an encoded video frame (e.g., bitstream). Similarly, the video codec is operable to decode an encoded video frame into an unencoded video frame. The video codecs 240 can be implemented in hardware, software, firmware, or a combination thereof. In operation, any of the video codecs 240) encodes and/or decodes groups of pixels (blocks) at a time based on a video compression standard.

The packetizer 238 is configured to generate packets corresponding to graphical data. For example, after a portion of a video frame is encoded, by one of the video codecs 240, into a bitstream, the packetizer 238 generates packets from the bitstream. The packetizer 238 puts the bitstream into packets that comply with a wireless communication protocol used by the wireless interface 228. The packetizer 238 can be implemented in hardware, software, firmware, or a combination thereof.

The video device 200 may comprise, or be operably coupled to, a display device (e.g., a CRT (cathode ray tube) or LCD (liquid crystal display) monitor) for displaying the video data, a keyboard, and a pointing device (e.g., a mouse or a trackball), by which a user can provide input.

Figure 3:
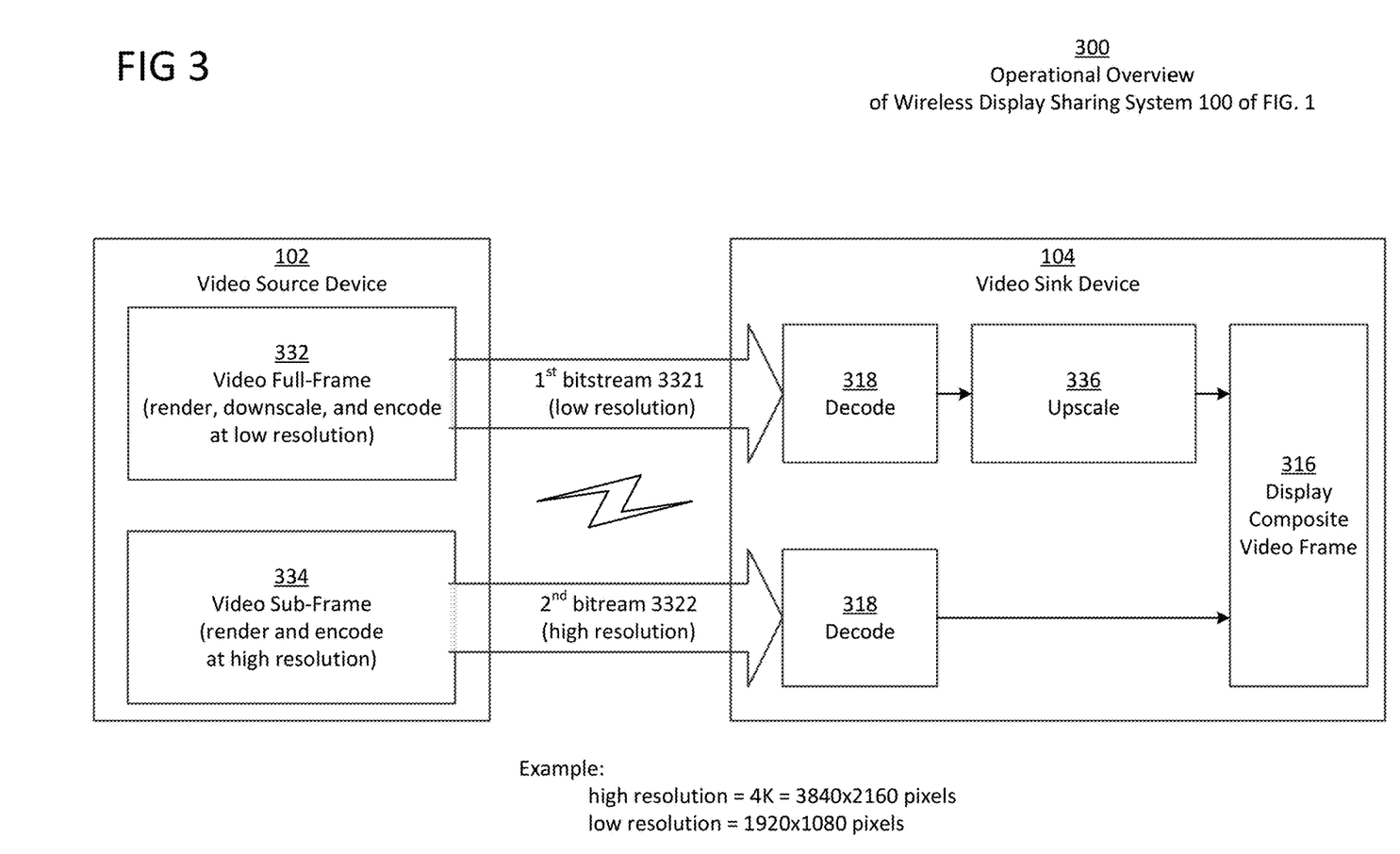
FIG. 3 illustrates a schematic diagram of an operational overview of the wireless display sharing system of FIG. 1, in accordance with aspects of the disclosure.

FIG. 3 illustrates a schematic diagram of an operational overview 300 of the wireless display sharing system 100 of FIG. 1, in accordance with aspects of the disclosure.

The video source device 102 is operable to dynamically switch between transmitting a video full-frame 332 and a video sub-frame 334. The processing circuitry 202 of the video source device 102 makes this decision based on factors such as an amount of available wireless transmission bandwidth, a number of pixels in a changed region of the video full-frame, spatial complexity of a changed region of the video full-frame, temporal complexity of a changed region of the video full-frame, and/or a category of region change of the video full-frame.

For video full-frame transmission, the video source device 102 renders, downscales, and encodes a video full-frame 332 into a first bitstream 3321 at a first resolution. Video full-frame transmissions are at a lower resolution, which reduces the duty cycle, and as a result, enhances latency and power efficiency. And the use of fewer encoded frames facilitates faster wireless transfer to the video sink device 104.

For video sub-frame transmission, the video source device 102 renders and encodes a video sub-frame 334 into a second bitstream 3322 at a second resolution. The second resolution is higher than the first resolution. Video sub-frame transmissions 334 are at a higher resolution to deliver a superior user visual experience for interactive tasks such as texting, menu pop-ups, and mouse click options in productivity applications.

The video sink device 104 is operable to receive the first bitstream 3321 and the second bitstream 3322 that were wirelessly transmitted from the video source device 102. The video sink device 104 decodes 318 and upscales 336 the first bitstream 3321, and decodes 318 the second bitstream. The video sink device 104 generates a composite video frame for display 316 based on the decoded and upscaled first bitstream and the decoded second bitstream.

Figure 4:
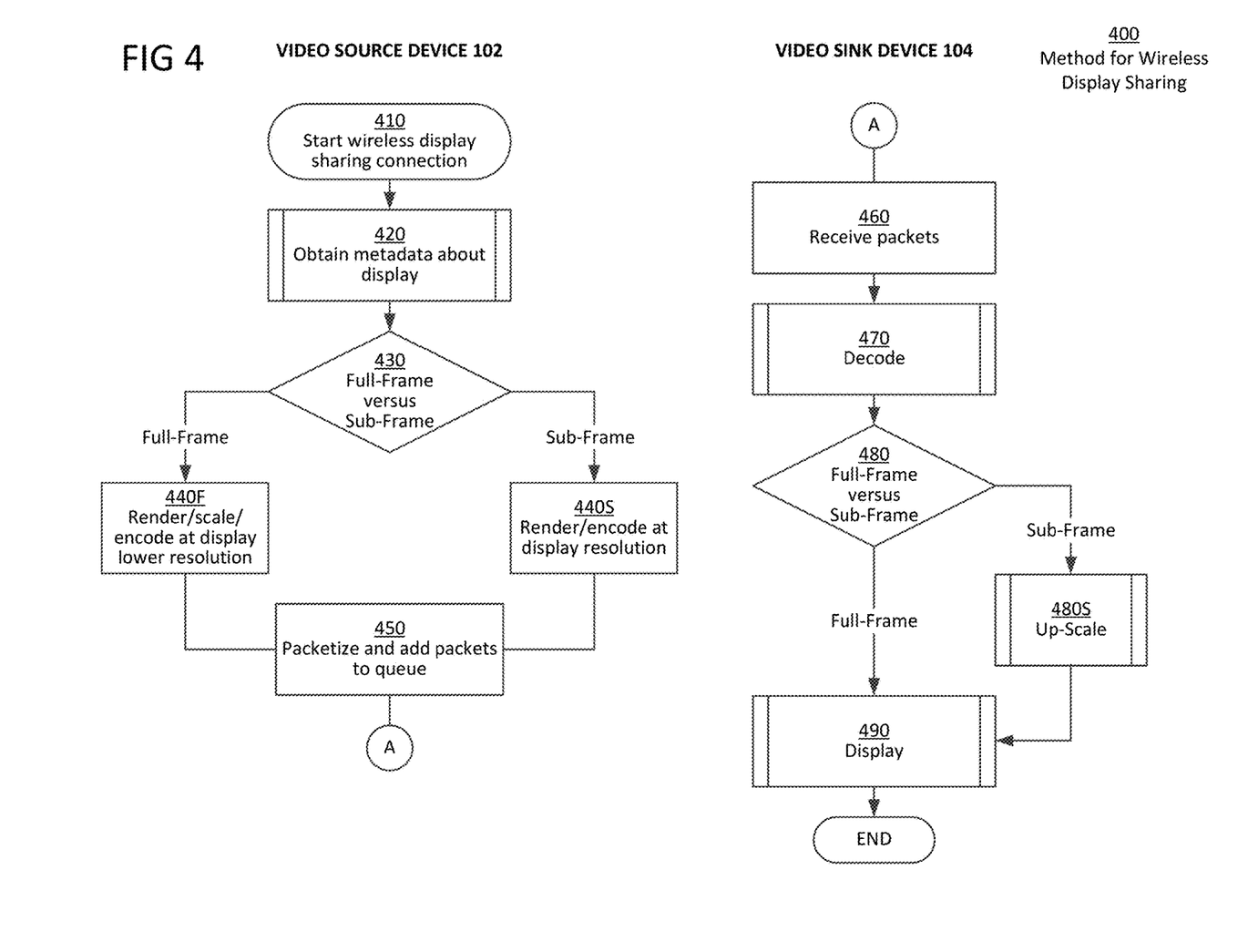
FIG. 4 illustrates a flowchart of a wireless display sharing method, in accordance with aspects of the disclosure.

FIG. 4 illustrates a flowchart of a wireless display sharing method 400, in accordance with aspects of the disclosure.

At Step 410, the video source device 102 starts wireless display sharing through a discovery process of scanning for available video sink devices on a same network. The video source device 102 then negotiates a connection with the video sink device 104 to establish a communication channel between the video source device 102 and the video sink device 104. And at Step 420, the video source device 102 obtains metadata about the video sink device 104.

At Step 430, the processing circuitry 202 of the video source device 102 decides between the encoding the video full-frame at the first resolution for the first bitstream 3321 and the encoding a video sub-frame at the second resolution for the second bitstream 3322. The processing circuitry 202 makes this decision based on factors monitored by the display engine 108. These factors include, but are not limited to, amount of available wireless transmission bandwidth, a number of pixels in a changed region of the video full-frame, spatial complexity of a changed region of the video full-frame, temporal complexity of a changed region of the video full-frame, and/or a category of region change of the video full-frame.

Then once the processing circuitry 202 decides between transmitting video full-frame versus video sub-frame, the encoder 110/240 encodes the video full-frame or video sub-frame at the respective resolution. If the processing circuitry 202 decides to transmit a video full-frame, at Step 440F the render engine 106/242 renders the video full-frame, the display engine 108/204 down-scales the video full frame to the lower resolution, and the encoder 110/240 encodes the down-scaled video full-frame into the first bitstream 3321. Alternatively, if the processing circuitry 202 decides to transmit a video sub-frame, at Step 440S the render engine 106/242 renders the video sub-frame, and the encoder 110/240 encodes the rendered subframe into the second bitstream 3322 at a higher, native display resolution, without a need for the down-scaling. Also, the encoder 110 encodes into the second bitstream 3322 a location of the video sub-frame within the video full-frame.

At Step 450, the packetizer 112 generates packets corresponding to the encoded video data to be placed in a buffer queue for transmission by the transmitter 114 to the video sink device 104.

At Step 460, the receiver 122 of the video sink device 104 receives the packets transmitted by the transmitter 114 of the video source device 102. And at Step 470, the decoder 118 decodes the received packets.

At Step 480, the processing circuitry 202 of the video sink device 104 determines whether the decoded frame is based on the first bitstream 3321 at the lower resolution or the second bitstream 3322 at the higher resolution. If the decoded frame is based on the first bitstream 3321 at the lower resolution, at Step 480S the display engine 204 upscales the decoded frame to the higher resolution as described above.

At Step 490, the display engine 108/204 of the video sink device 104 generates the composite video frame with the decoded and upscaled first bitstream 3321 as a base layer, and the decoded second bitstream 3322 as an overlay on the base layer. The last video frame transmitted at the full resolution is used as one layer of the composition and is upscaled to the native resolution. Any relevant video sub-frames that have been transmitted are composited on top of the full resolution frame and do not require scaling since they were transmitted at the higher resolution. In this manner video changes while typing appear to the user as visually lossless even if the background wallpaper does not have the same visually lossless image fidelity.

The encoder 110/240 encodes an initial video full-frame into the second bitstream 3322 at the second, higher resolution. During user operation, documents may be opened requiring a full-frame transmission. For instance, opening a word processing document in full screen mode would be sent as a full-frame transmission. Since typically, it takes some seconds for the user to begin to interact with the document. The initial video full-frame is transmitted at the higher resolution and maintained for the encoder operation.

Video sub-frame changes may be stored to be added or removed. For instance, a context menu may appear when a user right clicks. Since this change is sent as a video sub-frame, the video sub-frame is composited on top of a prior video full-frame. Once the user clicks away, the context menu disappears. This disappearance would simply include a transmission indicating that the video sub-frame is no longer valid, and the composition would return to the prior full resolution video frame.

During periods of little or no change (i.e., pixel changes are below a predetermined threshold level), video blocks with higher complexity are transmitted at the higher resolution to gradually refresh the full frame. At the video sink device 140, a separate frame is stored at the higher resolution as the last fully composited frame. The encoder 110 tracks the complexity of blocks based on their spatial and temporal complexity, which indicate how easy it is to compress the pixel content. These video sub-frames are sent as permanent compositions, unlike a context menu that can be composited or removed from composition. Feedback about the amount of change and relative complexity could either be provided by the display engine 108 during composition (if utilized) or directly from the application that has registered a change.

Figure 5A:
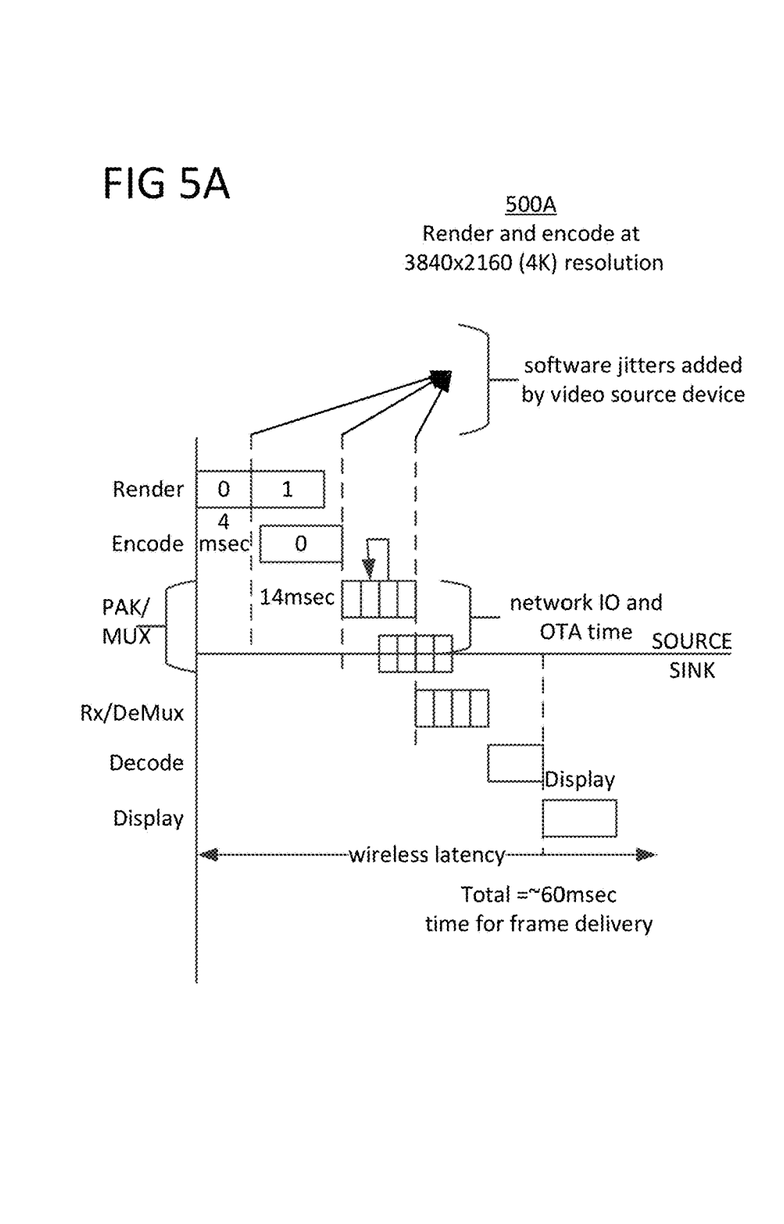
FIGS. 5A and 5B illustrates wireless display sharing timing diagrams 500, in accordance with aspects of the disclosure.
Figure 5B:
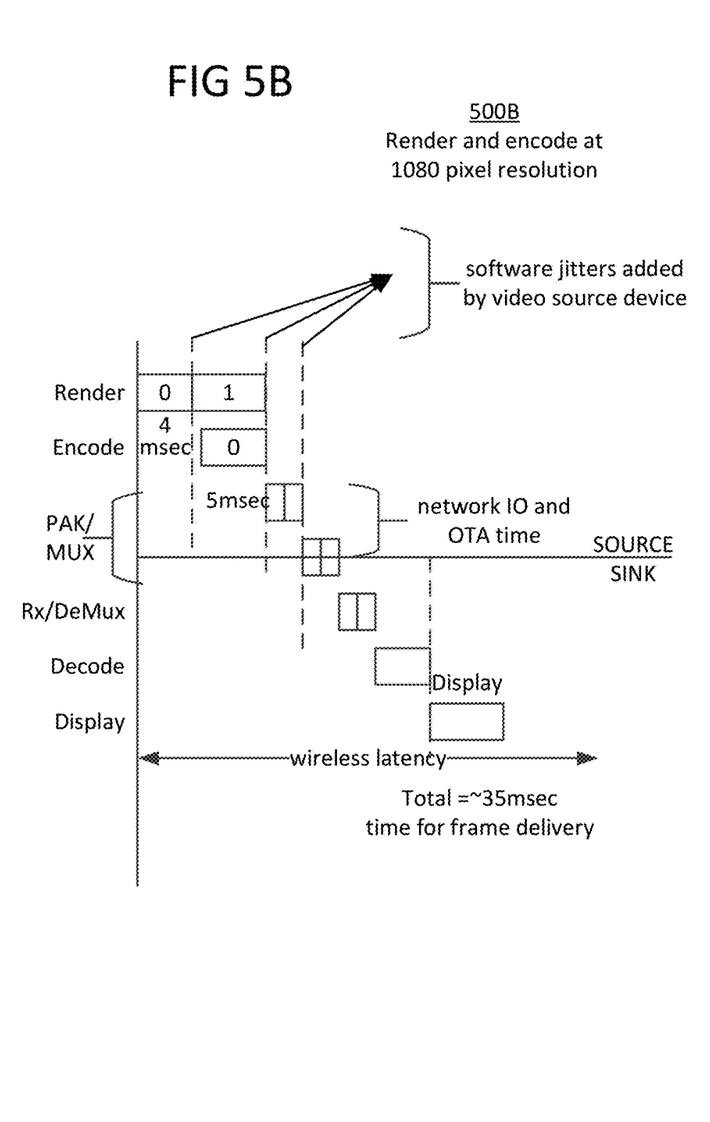

FIGS. 5A and 5B illustrates wireless display sharing timing diagrams 500, in accordance with aspects of the disclosure.

FIGS. 5A and 5B illustrate processing times for a video source device 102 to render and encode at different resolutions. FIG. 5A shows that for 4K resolution, the video source device 102 takes more than 30 msec, while for 1080 resolution, it takes about 17 msec. Rendering and encoding processing time for 4K resolution takes longer to complete, which results in a longer end-to-end time for video stream delivery to the video sink device 104. The wireless display sharing technique disclosed herein dynamically switches between video full-frame and video sub-frame and rendering and encoding at different resolutions to improve latency and power consumption, with less noticeable difference to the end user.

The techniques of this disclosure may also be described in the following examples.

Example 1. A video source device for wireless display sharing, comprising: an encoder operable to dynamically switch between encoding a video full-frame into a first bitstream at a first resolution, and a video sub-frame into a second bitstream at a second resolution, wherein the second resolution is higher than the first resolution; processing circuitry operable to decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and a transmitter operable to wirelessly transmit the first bitstream and the second bitstream to a video sink device.

Example 2. The video source device of example 1, wherein during a time period when the video full-frame has below a predetermined threshold level of pixel change, the encoder is further operable to encode the video full-frame into the second bitstream at the second resolution for refreshing the video full-frame for display at the video sink device at the second resolution.

Example 3. The video source device of any of examples 1-2, wherein the processing circuitry is further operable to: decide between the encoding the video full-frame at the first resolution and the encoding the video sub-frame at the second resolution, based on an amount of available wireless transmission bandwidth.

Example 4. The video source device of any of examples 1-3, further comprising: a display engine operable to monitor the amount of available wireless transmission bandwidth.

Example 5. The video source device of any of examples 1-4, wherein the encoder is further operable to encode into the second bitstream a location of the video sub-frame within the video full-frame.

Example 6. The video source device of any of examples 1-5, wherein the encoder is further operable to encode an initial video full-frame into the second bitstream at the second resolution.

Example 7. The video source device of any of examples 1-6, wherein the video source device is a virtual reality (VR) or artificial reality (AR) device.

Example 8. A wireless display sharing system, comprising: the video source device of any of examples 1-7; and a video sink device operable to receive the first bitstream and the second bitstream transmitted wirelessly, decode the first bitstream, upscale the decoded first bitstream from the first resolution to the second resolution, decode the second bitstream, and generate a composite video frame for display based on the decoded and upscaled first bitstream and the decoded second bitstream.

Example 9. A video sink device for wireless display sharing, comprising: a receiver operable to wirelessly receive a first bitstream and a second bitstream from a video source device, wherein the second resolution is higher than the first resolution; a decoder operable to dynamically switch between decoding the first bitstream into a video full-frame at a first resolution, and the second bitstream into a video sub-frame at a second resolution; and a scaler operable to upscale the decoded first bitstream from the first resolution to the second resolution; and a display operable to display a composite video frame for display based on the decoded and upscaled first bitstream and the decoded second bitstream.

Example 10. The video sink device of example 9, wherein the composite video frame is generated with the decoded and upscaled first bitstream as a base layer, and the decoded second bitstream as an overlay on the base layer.

Example 11. The video sink device of any of examples 9-10, wherein the video sink device is a virtual reality (VR) or artificial reality (AR) device.

Example 12. A wireless display sharing system, comprising: a video source device operable to dynamically switch between encoding a video full-frame into a first bitstream at a first resolution, and a video sub-frame into a second bitstream at a second resolution, wherein the second resolution is higher than the first resolution, and to wirelessly transmit the first bitstream and the second bitstream; and the video sink device of any of examples 9-11.

Example 13. A component of a video source device for wireless display sharing, comprising: processing circuitry; and a non-transitory computer-readable storage medium including instructions that, when executed by the processing circuitry, cause the processing circuitry to: dynamically switch between encoding a video full-frame into a first bitstream at a first resolution, and a video sub-frame into a second bitstream at a second resolution, wherein the second resolution is higher than the first resolution; decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and cause a transmitter to wirelessly transmit the first bitstream and the second bitstream to a video sink device.

Example 14. The component of example 13, wherein the instructions further to cause the processing circuitry to: during a time period when the video full-frame has below a predetermined threshold level of pixel change, encode the video full-frame into the second bitstream at the second resolution for refreshing the video full-frame for display at the video sink device at the second resolution.

Example 15. The component of any of examples 13-14, wherein the instructions further to cause the processing circuitry to: decide between the encoding the video full-frame at the first resolution and the encoding the video sub-frame at the second resolution, based on an amount of available wireless transmission bandwidth.

Example 16. The component of any of examples 13-15, wherein the instructions further to cause the processing circuitry to: encode into the second bitstream a location of the video sub-frame within the video full-frame.

Example 17. The component of any of examples 13-16, wherein the instructions further to cause the processing circuitry to: encode an initial video full-frame into the second bitstream at the second resolution.

Example 18. A component of a video sink device for wireless display sharing, comprising: processing circuitry; and a non-transitory computer-readable storage medium including instructions that, when executed by the processing circuitry, cause the processing circuitry to: dynamically switch between decoding a first bitstream into a video full-frame at a first resolution, and a second bitstream into a video sub-frame at a second resolution, wherein the first bitstream and the second bitstream were received from a video source device, and the second resolution is higher than the first resolution; and upscale the decoded first bitstream from the first resolution to the second resolution; and generate a composite video frame for display based on the decoded and upscaled first bitstream and the decoded second bitstream.

Example 19. The component of example 18, wherein the instructions further to cause the processing circuitry to: generate the composite video frame with the decoded and upscaled first bitstream as a base layer, and the decoded second bitstream as an overlay on the base layer.

Example 20. A video source device for wireless display sharing, comprising: an encoding means for dynamically switching between encoding a video full-frame into a first bitstream at a first resolution, and a video sub-frame into a second bitstream at a second resolution, wherein the second resolution is higher than the first resolution; processing means for deciding between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and a transmitting means for wirelessly transmitting the first bitstream and the second bitstream to a video sink device.

Example 21. The video source device of example 20, wherein during a time period when the video full-frame has below a predetermined threshold level of pixel change, the encoder is further operable to encode the video full-frame into the second bitstream at the second resolution for refreshing the video full-frame for display at the video sink device at the second resolution.

Example 22. The video source device of any of examples 20-21, wherein the processing circuitry is further for deciding between the encoding the video full-frame at the first resolution and the encoding the video sub-frame at the second resolution, based on an amount of available wireless transmission bandwidth.

Example 23. The video source device of any of examples 20-22, further comprising: a display engine means for monitoring the amount of available wireless transmission bandwidth.

Example 24. The video source device of any of examples 20-23, wherein the encoding means is further for encoding into the second bitstream a location of the video sub-frame within the video full-frame.

Example 25. The video source device of any of examples 20-24, wherein the encoding means is further for encoding an initial video full-frame into the second bitstream at the second resolution.

Example 26. The video source device of any of examples 20-25, wherein the video source device is a virtual reality (VR) or artificial reality (AR) device.

Example 27. A wireless display sharing system, comprising: the video source device of any of examples 20-26; and a video sink device operable to receive the first bitstream and the second bitstream transmitted wirelessly, decode the first bitstream, upscale the decoded first bitstream from the first resolution to the second resolution, decode the second bitstream, and generate a composite video frame for display based on the decoded and upscaled first bitstream and the decoded second bitstream.

Example 28. A video sink device for wireless display sharing, comprising: a receiving means for wirelessly receiving a first bitstream and a second bitstream from a video source device, wherein the second resolution is higher than the first resolution; a decoding means for dynamically switching between decoding the first bitstream into a video full-frame at a first resolution, and the second bitstream into a video sub-frame at a second resolution; and a scaling means for upscaling the decoded first bitstream from the first resolution to the second resolution; and a display means for displaying a composite video frame for display based on the decoded and upscaled first bitstream and the decoded second bitstream.

Example 29. The video sink device of example 28, wherein the composite video frame is generated with the decoded and upscaled first bitstream as a base layer, and the decoded second bitstream as an overlay on the base layer.

Example 30. The video sink device of any of examples 28-29, wherein the video sink device is a virtual reality (VR) or artificial reality (AR) device.

Example 31. A wireless display sharing system, comprising: a video source device operable to dynamically switch between encoding a video full-frame into a first bitstream at a first resolution, and a video sub-frame into a second bitstream at a second resolution, wherein the second resolution is higher than the first resolution, and to wirelessly transmit the first bitstream and the second bitstream; and the video sink device of any of examples 28-30.

Example 32. A component of a video source device for wireless display sharing, comprising: processing means; and a non-transitory computer-readable storage medium including instructions that, when executed by the processing means, cause the processing means to: dynamically switch between encoding a video full-frame into a first bitstream at a first resolution, and a video sub-frame into a second bitstream at a second resolution, wherein the second resolution is higher than the first resolution; decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and cause a transmitter to wirelessly transmit the first bitstream and the second bitstream to a video sink device.

Example 33. The component of example 32, wherein the instructions further to cause the processing means to: during a time period when the video full-frame has below a predetermined threshold level of pixel change, encode the video full-frame into the second bitstream at the second resolution for refreshing the video full-frame for display at the video sink device at the second resolution.

Example 34. The component of any of examples 32-33, wherein the instructions further to cause the processing means to: decide between the encoding the video full-frame at the first resolution and the encoding the video sub-frame at the second resolution, based on an amount of available wireless transmission bandwidth.

Example 35. The component of any of examples 32-34, wherein the instructions further to cause the processing means to: encode into the second bitstream a location of the video sub-frame within the video full-frame.

Example 36. The component of any of examples 32-35, wherein the instructions further to cause the processing means to: encode an initial video full-frame into the second bitstream at the second resolution.

Example 37. A component of a video sink device for wireless display sharing, comprising: processing means; and a non-transitory computer-readable storage medium including instructions that, when executed by the processing means, cause the processing means to: dynamically switch between decoding a first bitstream into a video full-frame at a first resolution, and a second bitstream into a video sub-frame at a second resolution, wherein the first bitstream and the second bitstream were received from a video source device, and the second resolution is higher than the first resolution; and upscale the decoded first bitstream from the first resolution to the second resolution; and generate a composite video frame for display based on the decoded and upscaled first bitstream and the decoded second bitstream.

Example 38. The component of example 37, wherein the instructions further to cause the processing means to: generate the composite video frame with the decoded and upscaled first bitstream as a base layer, and the decoded second bitstream as an overlay on the base layer.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A video source device for wireless display sharing, comprising:
    an encoder operable to dynamically switch between encoding a video full-frame into a first bitstream at a first resolution, and a video sub-frame into a second bitstream at a second resolution, wherein the second resolution is higher than the first resolution;
    processing circuitry operable to decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and
    a transmitter operable to wirelessly transmit the first bitstream and the second bitstream to a video sink device.

2. The video source device of claim 1, wherein during a time period when the video full-frame has below a predetermined threshold level of pixel change, the encoder is further operable to encode the video full-frame into the second bitstream at the second resolution for refreshing the video full-frame for display at the video sink device at the second resolution.

3. The video source device of claim 1, wherein the processing circuitry is further operable to:
    to decide between the encoding the video full-frame at the first resolution and the encoding the video sub-frame at the second resolution, based on an amount of available wireless transmission bandwidth.

4. The video source device of claim 3, further comprising:
    a display engine operable to monitor the amount of available wireless transmission bandwidth.

5. The video source device of claim 1, wherein the encoder is further operable to encode into the second bitstream a location of the video sub-frame within the video full-frame.

6. The video source device of claim 1, wherein the encoder is further operable to encode an initial video full-frame into the second bitstream at the second resolution.

7. The video source device of claim 1, wherein the video source device is a virtual reality (VR) or artificial reality (AR) device.

8. A wireless display sharing system, comprising:
the video source device of claim 1; and
a video sink device operable to receive the first bitstream and the second bitstream transmitted wirelessly, decode the first bitstream, upscale the decoded first bitstream from the first resolution to the second resolution, decode the second bitstream, and generate a composite video frame for display based on the decoded and upscaled first bitstream and the decoded second bitstream.

9. A video sink device for wireless display sharing, comprising:
a receiver operable to wirelessly receive a first bitstream and a second bitstream from a video source device, wherein the second resolution is higher than the first resolution;
a decoder operable to dynamically switch between decoding the first bitstream into a video full-frame at a first resolution, and the second bitstream into a video sub-frame at a second resolution; and
a scaler operable to upscale the decoded first bitstream from the first resolution to the second resolution; and
a display operable to display a composite video frame for display based on the decoded and upscaled first bitstream and the decoded second bitstream.

10. The video sink device of claim 9, wherein the composite video frame is generated with the decoded and upscaled first bitstream as a base layer, and the decoded second bitstream as an overlay on the base layer.

11. The video sink device of claim 9, wherein the video sink device is a virtual reality (VR) or artificial reality (AR) device.

12. A wireless display sharing system, comprising:
a video source device operable to dynamically switch between encoding a video full-frame into a first bitstream at a first resolution, and a video sub-frame into a second bitstream at a second resolution, wherein the second resolution is higher than the first resolution, and to wirelessly transmit the first bitstream and the second bitstream; and
the video sink device of claim 9.

13. A component of a video source device for wireless display sharing, comprising:
processing circuitry; and
a non-transitory computer-readable storage medium including instructions that, when executed by the processing circuitry, cause the processing circuitry to:
dynamically switch between encoding a video full-frame into a first bitstream at a first resolution, and a video sub-frame into a second bitstream at a second resolution, wherein the second resolution is higher than the first resolution;
decide between encoding the video full-frame and encoding the video sub-frame based on an amount of available wireless transmission bandwidth, a number of pixels in a changed region of the video full-frame, spatial complexity of a changed region of the video full-frame, temporal complexity of a changed region of the video full-frame, or a category of region change of the video full-frame; and
cause a transmitter to wirelessly transmit the first bitstream and the second bitstream to a video sink device.

14. The component of claim 13, wherein the instructions further to cause the processing circuitry to:
during a time period when the video full-frame has below a predetermined threshold level of pixel change, encode the video full-frame into the second bitstream at the second resolution for refreshing the video full-frame for display at the video sink device at the second resolution.

15. The component of claim 13, wherein the instructions further to cause the processing circuitry to:
decide between the encoding the video full-frame at the first resolution and the encoding the video sub-frame at the second resolution, based on an amount of available wireless transmission bandwidth.

16. The component of claim 13, wherein the instructions further to cause the processing circuitry to:
encode into the second bitstream a location of the video sub-frame within the video full-frame.

17. The component of claim 13, wherein the instructions further to cause the processing circuitry to:
encode an initial video full-frame into the second bitstream at the second resolution.

18. A component of a video sink device for wireless display sharing, comprising:
processing circuitry; and
a non-transitory computer-readable storage medium including instructions that, when executed by the processing circuitry, cause the processing circuitry to:
dynamically switch between decoding a first bitstream into a video full-frame at a first resolution, and a second bitstream into a video sub-frame at a second resolution, wherein the first bitstream and the second bitstream were received from a video source device, and the second resolution is higher than the first resolution; and
upscale the decoded first bitstream from the first resolution to the second resolution; and
generate a composite video frame for display based on the decoded and upscaled first bitstream and the decoded second bitstream.

19. The component of claim 18, wherein the instructions further to cause the processing circuitry to:
generate the composite video frame with the decoded and upscaled first bitstream as a base layer, and the decoded second bitstream as an overlay on the base layer.

* * * * *